United States Patent [19]
Visser

[11] Patent Number: 6,062,972
[45] Date of Patent: May 16, 2000

[54] CARRIAGE FOR SUPPORTING A BREAST PIECE OF POULTRY

[75] Inventor: Dirk Visser, Oostzaan, Netherlands

[73] Assignee: Machinefabriek Meyn B.V., Oostzaan, Netherlands

[21] Appl. No.: 09/014,822

[22] Filed: Jan. 28, 1998

[30] Foreign Application Priority Data

Jan. 28, 1997 [NL] Netherlands ............................ 1005105

[51] Int. Cl.⁷ ................................................. A22C 17/02
[52] U.S. Cl. ........................................... 452/165; 452/170
[58] Field of Search ..................................... 452/165, 170

[56] References Cited

U.S. PATENT DOCUMENTS

| | | |
|---|---|---|
| 4,688,297 | 8/1987 | Bartels . |
| 5,045,024 | 9/1991 | Diesing . |
| 5,269,722 | 12/1993 | Diesing et al. . |
| 5,273,485 | 12/1993 | Hegelmann et al. . |
| 5,466,185 | 11/1995 | Martin et al. . |
| 5,474,491 | 12/1995 | Koch . |
| 5,643,074 | 7/1997 | Linnenbank . |
| 5,697,837 | 12/1997 | Verrijp et al. . |
| 5,833,527 | 11/1998 | Hazenbroek et al. ................. 452/165 |

FOREIGN PATENT DOCUMENTS

| | | |
|---|---|---|
| 4134621C1 | 10/1992 | Germany . |
| 1003626 | 3/1997 | Netherlands . |

OTHER PUBLICATIONS

The Netherlands Patent Office Search Report, Sep. 9, 1997.

*Primary Examiner*—Willis Little
*Attorney, Agent, or Firm*—Dority & Manning

[57] ABSTRACT

The invention relates to a carriage for supporting a poultry breast piece and includes a surface engaging the inner side of said breast piece and a device for holding the breast piece to the carriage. The carriage comprises at one side a projecting head, which at its bottom is provided with a slit-shaped recess extending in the plane of symmetry of the carriage. It is possible that shortly behind the head, in the plane of symmetry of the carriage, a projection is provided. A U-shaped clamping brace cooperating with the head may be included.

9 Claims, 3 Drawing Sheets

CARRIAGE FOR SUPPORTING A BREAST PIECE OF POULTRY

The invention relates to a carriage for supporting a breast piece of poultry at least comprising its breast, comprising a surface engaging the inner side of said breast piece and means for holding the breast piece on the carriage.

During mechanised filleting such a breast piece a filleting apparatus is used in which a plurality of carriages of the abovementioned type follow and endless track. A breast piece, which subsequently passes filleting devices positioned alongside the track followed by the carriages, is fitted to each carriage.

The conventional carriages of the abovementioned type are intended for receiving a so-called breast part or breast cup mainly consisting of that part of the poultry breast, in which the keel bone, clavicles and coracoids are incorporated.

Although processing of such breast parts or breast cups occurs on a large scale, there are also areas (regions, countries) where the so-called "front half" plays a very, important role. Principally said front half consists of the aforementioned breast part completed by the shoulder region (mainly part of the spine and floating ribs). It appeared that the conventional carriage is practically not suitable for correctly supporting such a front half.

It is an object of the invention to provide a carriage being able to support a front half in a correct way.

For this purpose the carriage according to the invention is characterized in that the carriage comprises at one side a projecting head, which at its bottom is provided with a slit-shaped recess extending in the plane of symmetry of the carriage.

The foremost part of the front half essentially defines a cavity enclosed by the clavicles, coracoids and spine with floating ribs, in which cavity the head of the carriage can be positioned. Herewith the spine, especially the thoracic and cervical vertebrae, are received in the slit-shaped recess. As a result of this combination of features the front half is in a stable position on the carriage of the invention.

It may be advantageous when, measured transversely to the carriage, the head is of a smaller width than the remainder of the carriage. This feature further contributes to the correct positioning of the front half onto the carriage.

The positioning of the front half onto the carriage may further be optimized if, shortly behind the head, in the plane of symmetry of the carriage, a projection is provided projecting from the surface, which projection is intended to co-operate with a natural recess at the inner side of the keel bone of the breast piece.

In this case it is preferred that the projection is semiconical, wherein the normal axis encloses an angle of 45° with the longitudinal axis of the carriage, such that the apex of the semi-cone is directed towards the head of the carriage. Then in practice an extremely correctly functioning projection appears to be obtained.

Anyhow, with respect to the features as described before, it is already guaranteed that the front half may be provided with a reproducable position on the carriage. For this purpose it is, however, generally required that means for fixing the front half in said position are applied as well. Therefore a special embodiment of the carriage in accordance with the invention is characterized by a U-shaped clamping brace co-operating with the head, said brace being movable between a position spaced apart from the head and a position partially embracing the head. In the position in which the clamping brace is spaced apart from the head, the front half can be positioned onto the carriage or be removed therefrom, respectively. In its position of partially embracing the head, the clamping brace clamps the foremost part of the front half, especially the part on either side of the spine, firmly onto the head of the carriage. In this position not only the position of the front half on the carriage is correctly defined, but also immovably holding the front half on the carriage is obtained.

In this respect it is further preferable that the clamping brace is mounted on a pivot arm being movable, while passing through a deadlock, from one position to another and vice versa. By the application of such a deadlock mechanism both positions of the clamping brace are stable. Therefore it is only necessary that the clamping brace or the mechanism driving the clamping brace moves through the deadlock without requiring additional measures to maintain the clamping brace in its respective position.

Such advantageous characteristics of a deadlock mechanism can be utilized when a special embodiment of the carriage is used, in which the carriage carries a follower roll causing the movement of the pivot arm, which follower roll can co-operate with a stationary curved track positioned alongside the track followed by the carriage. When the follower roll has moved the clamping brace, or the mechanism driving it, through the deadlock it is no longer required that the follower roll co-operates with the curved track, since the obtained position of the clamping brace is stable. As a result unnecessary forces acting on the carriage (caused by the co-operation between the follower roll and the stationary curved track) can be avoided. The co-operation between the follower roll and stationary curved track is only required at those instances, at which the clamping brace is moved from one position to another and vice versa.

Hereinafter the invention will be explained further with reference to the drawing illustrating an embodiment of the carriage according to the invention.

Figure 2:
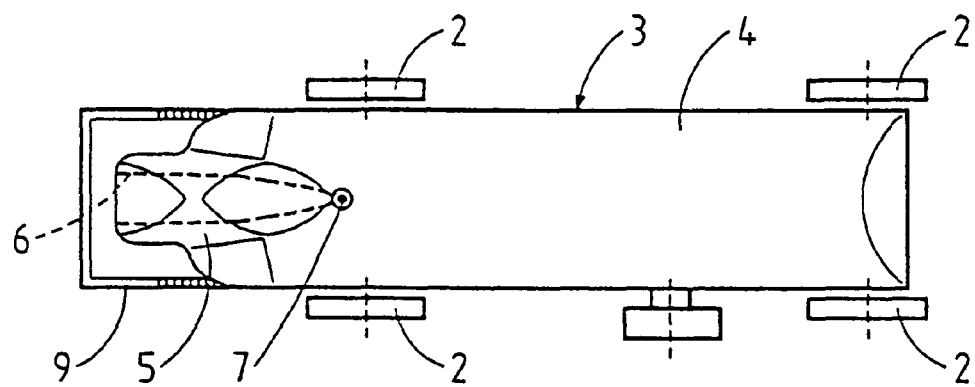
FIG. 2 shows a top plan view of the same carriage.

The carriage according to the invention is intended for supporting a so-called front half. Such a front half will further be described hereinafter with reference to FIG. 3. The carriage comprises a frame 1 being provided with wheels 2. With the wheels 2 the frame 1 can move along a track (not further illustrated) of a filleting apparatus. On the frame 1 the actual carriage 3 comprising a surface 4 for engaging the inner side of the front half is mounted.

At one side, measured in the direction of movement of the carriage 3 the foremost side, the carriage comprises a projecting head 5. At the bottom the head 5 is provided with a slit-shaped recess 6 extending in the plane of symmetry of the carriage 3.

Figure 5:
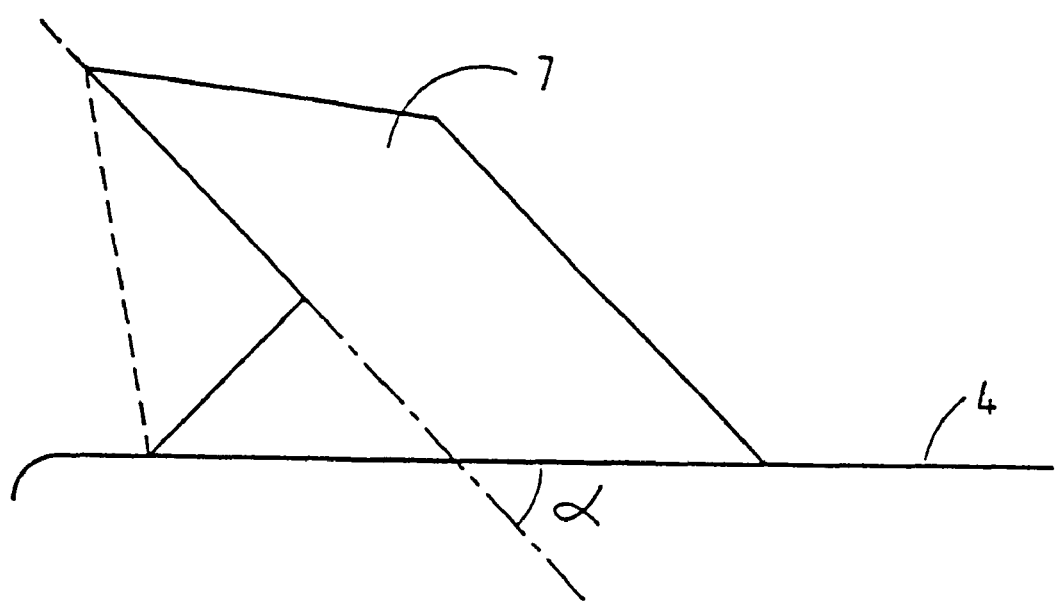
FIG. 5 shows an amended detail on a larger scale.

As appears clearly from FIG. 2, the head 5, measured transversely to the carriage 3, is of a smaller width than the remainder of the carriage. Further, shortly behind the head 5, in the plane of symmetry of the carriage 3, a projection 7 is provided projecting from the surface 4. FIG. 5 shows an amended projection on a larger scale. In that case a semiconical projection is provided, the normal axis of which encloses an angle of 45° with the longitudinal axis of the carriage (angle α) and is directed forwardly (towards the head of the carriage).

With an angled pivot arm 8 a U-shaped clamping brace 9 is pivotable around a pivot 10 in the frame 1. Around a second pivot 11 an arm 12 is pivotable which at its opposite end carries a follower roll 13 projecting beyond the frame 1. Finally a connecting arm 14 defines a hinging connection between the movable end of arm 12 and the angled pivot arm 8.

The assembly comprising angled pivot arm 8, arm 12 and connecting arm 14 defines a deadlock mechanism which will be explained further hereinafter.

Figure 3:
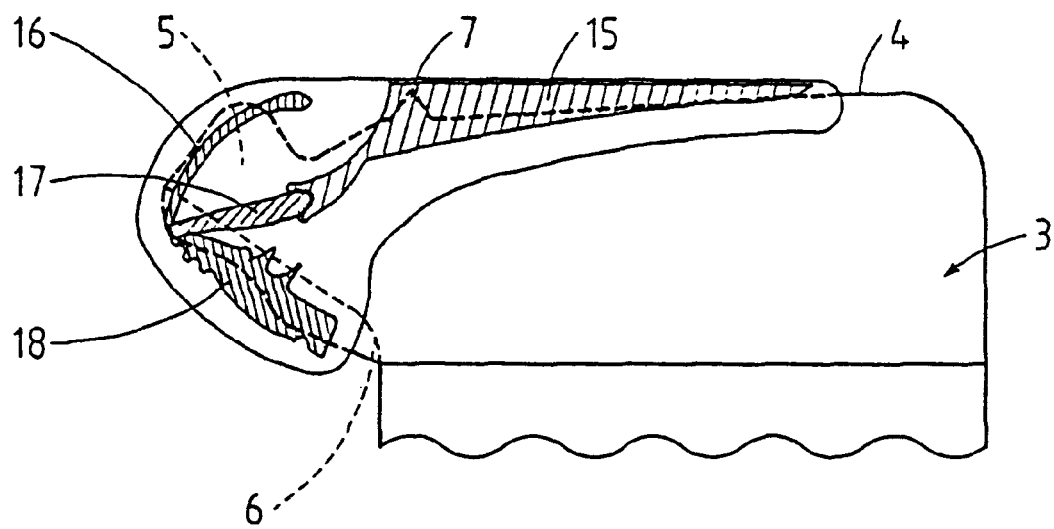
FIG. 3 shows the uppermost part of said carriage, onto which a front half is positioned.

FIG. 3 illustrates how a so-called front half is positioned onto the carriage 3. The front half comprises that part of the poultry breast including the keel bone 15, the V-like extending clavicles 16, the coracoids 17 and the spine 18 (consisting of cervical and thoracic vertebrae and a part of the floating ribs). In the illustrated position of the respective breast part, of course further comprising meat and skin encapsulating the aforementioned bones, the spine 18 (i.e. thoracic and cervical vertebrae) is incorporated in the recess 6 defined in the bottom of the head 5. Further the projection 7 is incorporated in a natural cavity at the inner side of the keel bone 15.

Figure 1:
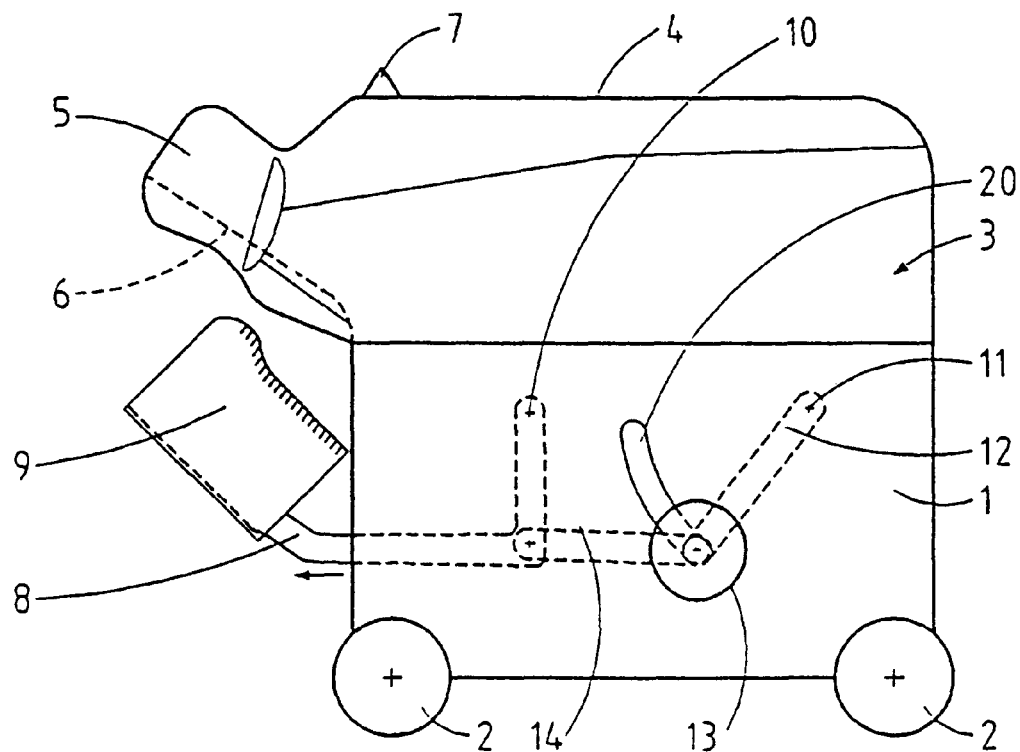
FIG. 1 shows an elevated side view of an embodiment of the carriage of the invention.
Figure 4:
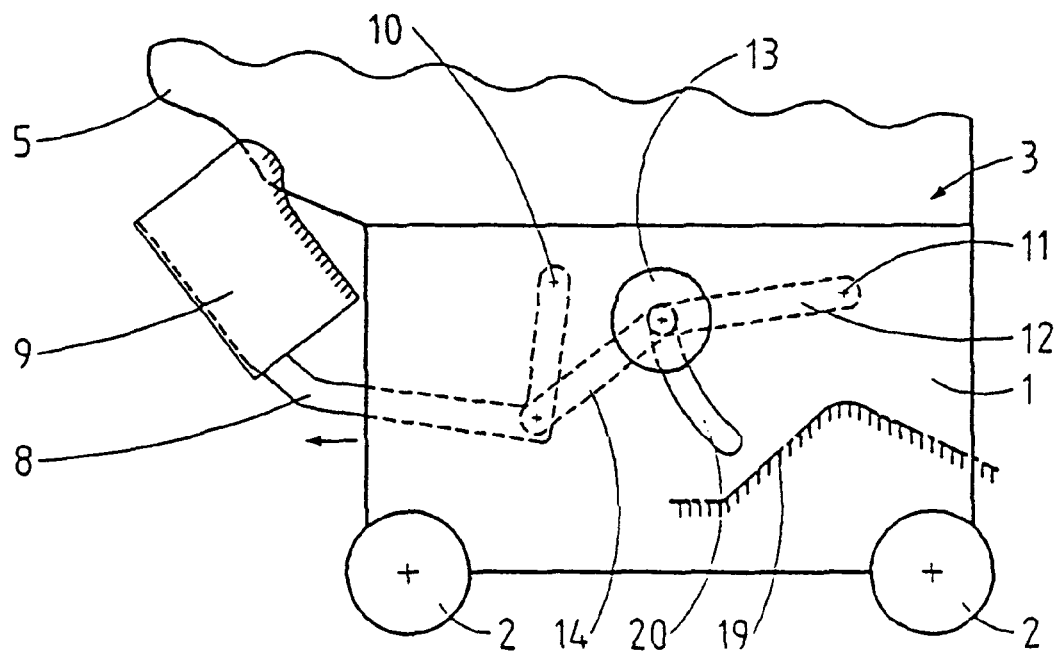
FIG. 4 shows a partial view according to FIG. 1, in a different position.

In the position of the-U-shaped clamping brace 9 illustrated in FIG. 1 it is spaced apart from the head 5 of the carriage 3. A breast piece can be positioned onto the carriage 3 in this position in accordance with FIG. 3. When a stationary curved track, positioned alongside the track followed by the carriage 3 and indicated schematically in FIG. 4 by a dotted line 19, subsequently engages the follower roll 13, said follower roll 13 is moved towards the position illustrated in FIG. 4. As a result the arm 12 pivots around the pivot 11. The outermost positions of the follower roll 13 are defined by a curved slit 20 defined in the frame 1. While moving from the position illustrated in FIG. 1 towards the position illustrated in FIG. 4 the follower roll 13 passes a position, in which the arm 12 and the connecting arm 14 are aligned. This position corresponds with a so-called deadlock of the mechanism. As a result both outermost positions of the mechanism illustrated in FIG. 1 and FIG. 4 are stable. This means that for maintaining the clamping position illustrated in FIG. 4, in which the U-shaped clamping brace 9 partially receives the head 5 of the carriage 3 and clamps the front half, it is not required that a constant engagement occurs between the curved track 19 and the follower roll 13. Therefore, in accordance with the course illustrated in FIG. 4, the curved track 19 may again diverge from the follower roll 13 without the latter leaving its achieved outermost position. In this way the generation of undesired forces between the curved track and the carriage may be avoided.

Of course the same is applicable for moving back the follower roll 13 towards the position illustrated in FIG. 1. Also in such a case it is only necessary that the curved track moves the follower roll 13 back towards the position illustrated in FIG. 1, whereafter for maintaining the achieved position any contact between follower roll 13 and curved track is no longer required.

When using the carriage of the invention it is possible to support the front half in an extremely stable and reproducable manner, in order to subject the front half to a filleting operation.

The invention is not limited to the embodiment described before, which can be varied in many ways within the scope of the invention as defined by the claims.

I claim:

1. A carriage for use in an automated poultry processing apparatus for supporting a poultry breast wherein the poultry breast includes a shoulder region of the breast, including part of the spine and floating ribs, as well as the breast cup, said carriage comprising a frame with a foremost end; a projecting head extending longitudinally from said frame; said projecting head further comprising a longitudinally extending recess defined in a bottom portion thereof, said recess having a shape and length to receive a spine of the poultry breast; and wherein said projecting head is disposed to extend into a cavity of the poultry breast while the spine of the poultry breast is received in said recess, and further comprising a movable clamping device disposed on said frame, said clamping device movable from a position spaced apart from said protecting head to a position at least partially embracing said projecting head along said bottom portion thereof so as to clamp the breast on either side of the spine against said projecting head.

2. The carriage as in claim 1, wherein said projecting head comprises a transverse width less than that of said frame.

3. The carriage as in claim 1, wherein said frame comprises an upper surface longitudinally rearward of said foremost end, and further comprising an upwardly extending projection disposed on said upper surface rearward of said projecting head, said projection disposed so as to engage in a natural recess at an inner side of the keel bone of the poultry breast.

4. The carriage as in claim 3, wherein said projection comprises a semi-conical configuration.

5. The carriage as in claim 4, wherein said projection comprises a surface defining an angle of about 45 degrees with the longitudinal axis of said carriage.

6. The carriage as in claim 1, wherein said clamping device comprises a brace mounted on a pivotal arm, said pivotal arm passing through a deadlock position when moving from one of said positions to the other of said positions.

7. The carriage as in claim 6, further comprising a follower roll connected to said pivotal arm to move said clamping device between said positions upon said follower roll moving on a curved track.

8. A carriage for use in an automated poultry processing apparatus for supporting a poultry breast wherein the poultry breast includes a shoulder region of the breast, including the spine and floating ribs, as well as the breast cup, said carriage comprising a frame with a foremost end and an upper surface extending longitudinally from said foremost end; a projecting head extending longitudinally from said frame; said projecting head further comprising a longitudinally extending recess defined in a bottom portion thereof; an upwardly extending projection disposed oil said upper surface rearward of said projecting head; and wherein said projecting head is disposed to extend into a cavity of the poultry breast while the spine of the poultry breast is received in said recess and said projection engages in a natural recess at an inner side of the keel bone of the poultry breast, and further comprising a clamping surface defined on said bottom portion of said projecting head against which the breast can be clamped on either side of the spine.

9. A carriage for use in an automated poultry processing apparatus for supporting a poultry breast wherein the poultry breast includes a shoulder region of the breast, including a portion of the spine and floating ribs, as well as the breast cup, said carriage comprising a frame with a foremost end and an upper surface extending longitudinally from said foremost end; a projecting head extending longitudinally from said frame; said projecting head further comprising a longitudinally extending recess defined in a bottom portion thereof configured for receipt of the spine portion of the breast; a movable clamping device disposed on said frame, said clamping device movable from a position spaced apart from said projecting head to a position at least partially embracing said projecting head along said bottom portion thereof; and wherein said projecting head is disposed to extend into a cavity of the poultry breast while the spine of the poultry breast is received in said recess and said clamping device is moved to said position at least partially embracing said projecting head so as to clamp the breast on either side of the spine against said bottom portion of said projecting head.

* * * * *